(12) United States Patent
Sampsell

(10) Patent No.: US 8,169,689 B2
(45) Date of Patent: May 1, 2012

(54) INTEGRATED MODULATOR ILLUMINATION

(75) Inventor: Jeffrey B. Sampsell, Pueblo West, CO (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 0 days.

(21) Appl. No.: 13/015,432

(22) Filed: Jan. 27, 2011

(65) Prior Publication Data
US 2011/0122479 A1    May 26, 2011

Related U.S. Application Data

(63) Continuation of application No. 11/417,808, filed on May 3, 2006, now Pat. No. 7,880,954, which is a continuation of application No. 10/794,825, filed on Mar. 5, 2004, now Pat. No. 7,706,050.

(51) Int. Cl.
*G02B 26/00* (2006.01)
*G02B 26/08* (2006.01)
*G02F 1/29* (2006.01)

(52) U.S. Cl. ........................... 359/291; 359/298

(58) Field of Classification Search .......... 359/290–292, 359/295, 298
See application file for complete search history.

(56) References Cited

U.S. PATENT DOCUMENTS

| | | | |
|---|---|---|---|
| 5,291,314 A | 3/1994 | Agranat | |
| 6,040,937 A | 3/2000 | Miles | |
| 6,292,504 B1 | 9/2001 | Halmos | |
| 6,407,785 B1 | 6/2002 | Yamazaki | |
| 6,522,373 B1 | 2/2003 | Hira et al. | |
| 6,603,520 B2 | 8/2003 | Umemoto | |
| 6,631,998 B2 | 10/2003 | Egawa et al. | |
| 6,652,109 B2 | 11/2003 | Nakamura | |
| 6,674,562 B1 | 1/2004 | Miles | |
| 6,706,339 B1 * | 3/2004 | Miyatake et al. | 428/1.31 |
| 6,829,258 B1 | 12/2004 | Carlisle | |
| 6,865,312 B2 | 3/2005 | Niv et al. | |
| 6,879,354 B1 | 4/2005 | Sawayama | |
| 7,110,158 B2 * | 9/2006 | Miles | 359/291 |
| 7,123,216 B1 | 10/2006 | Miles | |
| 7,262,754 B1 | 8/2007 | Yamazaki | |
| 7,355,780 B2 | 4/2008 | Chui | |

(Continued)

FOREIGN PATENT DOCUMENTS

EP    0 879 991    11/1998

(Continued)

OTHER PUBLICATIONS

Office Action in U.S. Appl. No. 11/417,808, dated Jun. 14, 2006.

(Continued)

*Primary Examiner* — Ricky Mack
*Assistant Examiner* — Brandi Thomas
(74) *Attorney, Agent, or Firm* — Knobbe Martens Olson & Bear LLP

(57) ABSTRACT

A spatial light modulator includes an array of elements to modulate light in accordance with image data. The modulator has a display panel having first and second surfaces arranged adjacent to the array of elements such that the second surface is directly adjacent the array of elements to allow a viewer to view an image produced by modulation of light The modulator may also include a light source to provide light to the display panel and illumination dots on the first surface of the display panel to reflect light from the source to the array of elements.

15 Claims, 4 Drawing Sheets

U.S. PATENT DOCUMENTS

| | | | |
|---|---|---|---|
| 7,508,571 | B2 | 3/2009 | Gally |
| 7,515,336 | B2 | 4/2009 | Lippey |
| 7,706,050 | B2 | 4/2010 | Sampsell |
| 7,855,827 | B2 | 12/2010 | Xu et al. |
| 7,880,954 | B2 | 2/2011 | Sampsell |
| 2001/0055208 | A1 | 12/2001 | Kimura |
| 2002/0176035 | A1 | 11/2002 | Yamazaki |
| 2003/0043157 | A1 | 3/2003 | Miles |
| 2003/0086031 | A1 | 5/2003 | Taniguchi |
| 2003/0099118 | A1 | 5/2003 | Saitoh |
| 2003/0210222 | A1 | 11/2003 | Ogiwara et al. |
| 2004/0080938 | A1 | 4/2004 | Holman |
| 2004/0109305 | A1 | 6/2004 | Chisholm |
| 2004/0188599 | A1 | 9/2004 | Viktorovitch |
| 2005/0088719 | A1* | 4/2005 | Patel et al. .............. 359/290 |
| 2005/0146897 | A1 | 7/2005 | Mimura |
| 2005/0179977 | A1 | 8/2005 | Chui et al. |
| 2005/0259302 | A9* | 11/2005 | Metz et al. .............. 359/15 |
| 2006/0066935 | A1 | 3/2006 | Cummings |
| 2006/0215958 | A1 | 9/2006 | Yeo |
| 2010/0141557 | A1 | 6/2010 | Gruhlke |

FOREIGN PATENT DOCUMENTS

| | | |
|---|---|---|
| EP | 0 984 314 | 3/2000 |
| EP | 1 347 315 | 9/2003 |
| EP | 1 748 305 | 1/2007 |
| GB | 2 351 834 | 1/2001 |
| JP | 09 171111 | 6/1997 |
| JP | 11 211999 | 8/1999 |
| JP | 11 326898 | 11/1999 |
| JP | 2000 081848 | 3/2000 |
| JP | 2000 181367 | 6/2000 |
| JP | 2000 314882 | 11/2000 |
| JP | 2001 021883 | 1/2001 |
| JP | 2002 108227 | 4/2002 |
| JP | 2002 174780 | 6/2002 |
| JP | 2003 344881 | 12/2003 |
| TW | 567388 | 12/2003 |
| WO | WO 98/19201 | 5/1998 |
| WO | WO 00/50807 | 8/2000 |
| WO | WO 01/84229 | 11/2001 |
| WO | WO 03/007049 | 1/2003 |
| WO | WO 2004/015489 | 2/2004 |
| WO | WO 2005/111669 | 11/2005 |

OTHER PUBLICATIONS

Amendment in U.S. Appl. No. 11/417,808, dated Sep. 14, 2006.
Final Office Action in U.S. Appl. No. 11/417,808, dated Nov. 27, 2006.
Request for Continued Examination and Amendment in U.S. Appl. No. 11/417,808, dated Feb. 26, 2007.
Office Action in U.S. Appl. No. 11/417,808, dated Jun. 29, 2007.
Amendment in U.S. Appl. No. 11/417,808, dated Oct. 1, 2007.
Office Action in U.S. Appl. No. 11/417,808, dated Jan. 2, 2008.
Response to Office Action in U.S. Appl. No. 11/417,808, dated Apr. 2, 2008.
Office Action in U.S. Appl. No. 11/417,808, dated Jul. 14, 2008.
Response to Office Action in U.S. Appl. No. 11/417,808, dated Jan. 13, 2009.
Final Office Action in U.S. Appl. No. 11/417,808, dated Apr. 6, 2009.
Request for Continued Examination and Response to Office Action in U.S. Appl. No. 11/417,808, dated Aug. 6, 2009.
Office Action in U.S. Appl. No. 11/417,808, dated Oct. 30, 2009.
Response to Office Action in U.S. Appl. No. 11/417,808, dated Feb. 1, 2010.
Notice of Allowance in U.S. Appl. No. 11/417,808, dated May 19, 2010.
Request for Continued Examination and Information Disclosure Statement in U.S. Appl. No. 11/417,808, dated Aug. 18, 2010.
Notice of Allowance in U.S. Appl. No. 11/417,808, dated Sep. 20, 2010.
Official Communication for European Application No. 10176513.9, dated Nov. 2, 2011.
Decision of Dismissal of Amendment in Japanese Application No. 2007-501906 dated Apr. 26, 2011.
Decision of Rejection in Japanese Application No. 2007-501906 dated Apr. 26, 2011.
Office Action in Japanese Application No. 2011-184671 dated Nov. 8, 2011.
Official Communication in Japanese Application No. 2010-010987 dated Apr. 26, 2011.
Final Office Action in Taiwanese Application No. 094106671 dated Nov. 18, 2010.

* cited by examiner

Figure 1a
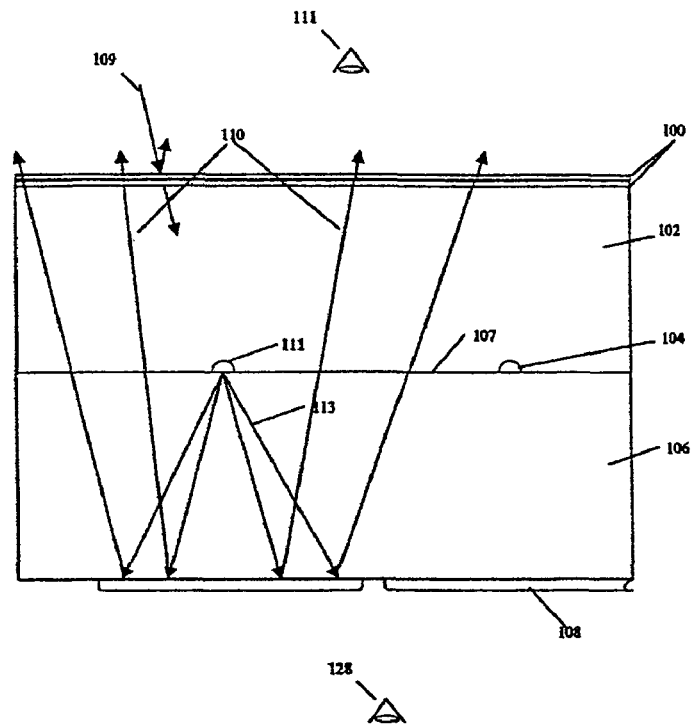
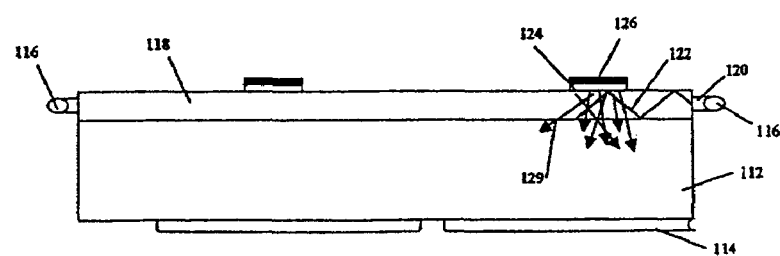
Figure 1b

INTEGRATED MODULATOR ILLUMINATION

CROSS-REFERENCE TO RELATED APPLICATIONS

This application is a continuation of co-pending U.S. application Ser. No. 11/417,808 entitled "Integrated Modulator Illumination," filed on May 3, 2006 which is a continuation of U.S. application Ser. No. 10/794,825 entitled "Integrated Modulator Illumination," filed on Mar. 5, 2004 (now U.S. Pat. No. 7,706,050). The disclosures of these prior applications are considered part of, and are incorporated by reference into, the disclosure of this application.

BACKGROUND

Spatial light modulators used for imaging applications come in many different forms. Transmissive liquid crystal device (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices (DMD™).

Another example of a spatial light modulator is an interferometric modulator that modulates light by interference, such as the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

Generally, the iMoD is a highly reflective, direct view, flat panel display. Because of its high reflectivity, the iMoD has little need for illumination in most lighting conditions. The typical consumer expects to be able to read electronic displays in situations where there is little ambient illumination. Some form of illumination is needed for the iMoD and other purely reflective spatial light modulators that typically use ambient illumination.

Backside illumination techniques used extensively with LCDs do not work for purely reflective spatial light modulators. A purely reflective spatial light modulator is one through which light cannot be transmitted from back to front in such a manner as to illuminate the modulator elements. It is possible to leave gaps between the elements of a purely reflective spatial light modulator to allow backside illumination to travel through and emerge at the front of the panel, but the light will not contain any image information, as the light does not actually illuminate the elements, passing them by on its path through the display panel.

In one approach, as discussed in U.S. patent application Ser. No. 10/224,029, filed Aug. 19, 2002 (Publication No. 20030043157) and shown in FIG. 1a, 'micro-lamps' 104 are manufactured into the surface of the glass 102 bonded to the glass substrate 106 of a purely reflective spatial light modulator array 108. Each micro-lamp has an inherent reflective layer 111 that assists in directing light 113 from the micro-lamp to the array 108. An antireflective (AR) coating 100 reduces the amount of incident light 109 reflected from the surface. The light incident upon the modulator array 108 travels along paths 110 through the interface 107 and eventually reaches the viewer 111. This approach is somewhat complex and requires an extra layer of glass 102, into which the arc lamps and their control circuitry must be manufactured.

In an alternative approach in the same US Patent Application, a light pipe is used that includes scattering centers. This approach is shown in FIG. 1b. The light source 116 is mounted on a light guide 118. The light 122 is coupled into the light guide using a collimator 120. Scatter pad, or scattering center, 124 is an area of the light guide that has been roughened with a wet or dry etch. The roughened areas are then coated with a thin film stack of an absorbing surface towards the viewer 128 and a reflective surface towards the surface 112 and ultimately the modulator array 114. Light trapped within the light guide comes in contact with the scatter pad 124 and the total internal reflection is violated, and some portion of the light 129 scatters in all directions, including towards the modulator array via a reflection off of the thin film stack 126.

In either of these approaches, there are some problems. The manufacturing process is made much more complicated with the addition of several parts. The addition of the glass 102 or the light guide 118 adds thickness to the modulator, which may create parallax issues and decrease the visual quality of the image.

BRIEF DESCRIPTION OF THE DRAWINGS

The invention may be best understood by reading the disclosure with reference to the drawings, wherein:

FIGS. 1a and 1b show prior art embodiments of methods to illuminate a purely reflective spatial light modulator.

DETAILED DESCRIPTION OF THE EMBODIMENTS

Figure 2:
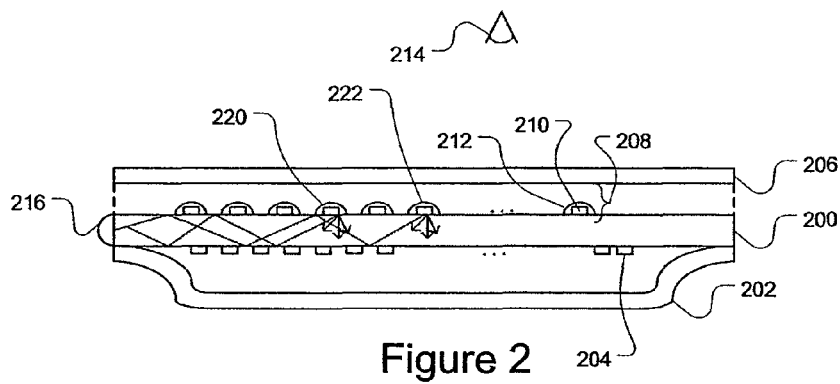
FIG. 2 shows an example of a spatial light modulator having illumination dots.

An embodiment of a purely reflective spatial light modulator having illumination dots is shown in FIG. 2. The spatial light modulator in this example is an interferometric modulator that modulates light by controlling the depth of a cavity between movable mirrors and optical films fabricated directly on the transparent substrate 200. Each element 204 of the array includes a miniature mirror suspended from the substrate. These mirrors can be individually activated to modulate the light that travels through the diffuser 206 and through the substrate 200 to reach the element 204. Each modulator element, when activated, can alter the color seen by a viewer 214 on the opposite side of the glass. Layer 202 acts as a back plate for the modulator and is generally opaque, rendering this type of modulator difficult to use with backlighting. The elements such as 204 are themselves opaque, which also makes backlighting difficult.

With application of a front lighting scheme, however, illumination dots 208 formed at the interface between the diffuser 206 and the substrate 200 can provide illumination for the display. Each dot 208 is comprised of a first layer 210 that is reflective towards the modulator array and a second layer 212 that is absorbing towards the viewer. This is similar to the scattering centers mentioned above, except that there is no need to add the extra step of wet or dry etching the substrate, as the illumination dots may be formed on the surface of the transparent substrate or the diffuser by various types of printing or thin film deposition techniques. While it is not necessary, the etching techniques may also be used on the transparent substrate if desired.

For purposes of discussion here, the display panel may be a combination of the substrate 200 and the diffuser 206, the substrate and an antireflective film, or just the substrate 200. The front panel has two surfaces. The first surface is that surface through which the viewer sees the modulated light. The second surface is that which is directly adjacent the modulator array. The first surface may have the diffuser on it, with the illumination dots considered to be on the first surface, regardless of whether they are formed on the substrate or the diffuser.

Interferometric modulators may use only ambient illumination. When used to create direct-view displays, they can utilize incoming light to form the images seen by the viewer. Illumination dots together with a light source associated with the display can supplement ambient light, increasing the brightness of the display. In total darkness, the illumination dots and the associated light source can provide all necessary illumination for the display. FIG. 2 also shows a light source 216, such as a cold cathode fluorescent tube or an edge emitting light pipe illuminated by a light emitting diode (LED), residing at one edge of the transparent substrate 200. Light emitted by the light source and properly injected into the transparent substrate would travel through the transparent substrate due to total internal reflection. It can be seen that light striking an illumination dot is reflected in several different directions as shown at dots 220 and 222.

The placement of the dots can be optimized depending upon the nature of the illumination and the environment in which the modulator may be used. For example, in FIG. 3a, the dot pattern is a very regular one. Dots in the dot pattern, such as dot 302, scatter light which subsequently strikes modulator elements such as elements 304a and 304b. The light scattered from dot 302 may have been internally reflected several times within transparent substrate 200 before striking dot 302 and being scattered.

Light injected into the transparent substrate will be internally reflected in the substrate. Without dots or some other perturbing surface structure this light will continue to traverse the substrate. With the use of illumination dots, the dot pattern can create uniform illumination. Various schemes can be applied to vary spacing in a regular way across the face of the transparent substrate to create uniform light emission, such as those shown in FIGS. 3b and 3c.

Figure 3A:
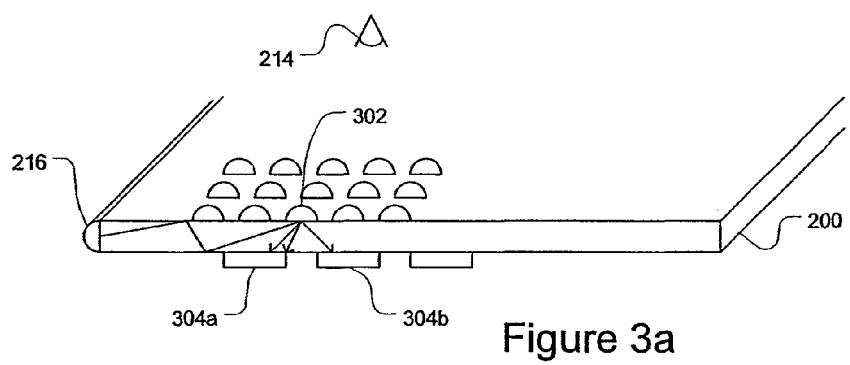
FIGS. 3a, 3b and 3c show different embodiments of illumination dot patterns used with an edge light.
Figure 3B:
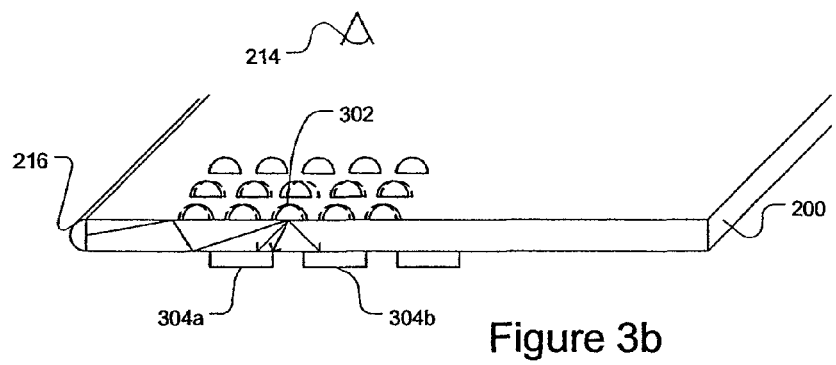
Figure 3C:
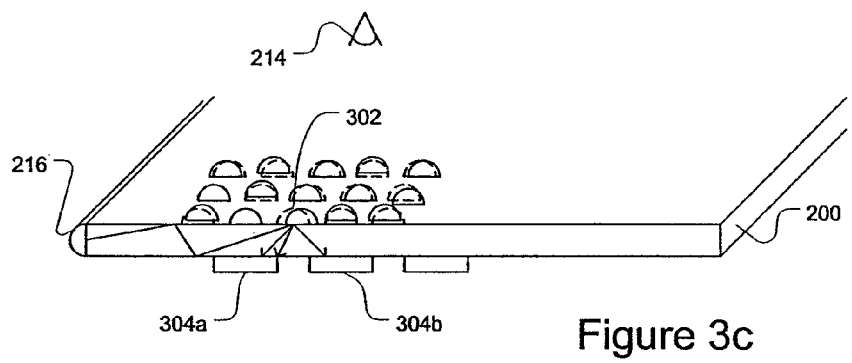

In FIG. 3b, the dot pattern is varied, but in a regular fashion, referred to here as a regular and varied pattern. The dot pattern of FIG. 3a is shown in dotted lines for comparison. As can be seen, each row, such as the one including element 302 is displaced from its previous position with a uniform variation. In the particular example of FIG. 3b, the first row varies 'forward' a particular distance from the previous position, and the second row varies a similar distance 'backwards.' This is just one example of a varied pattern with regular variation. FIG. 3c, in comparison not only employs variation but also includes spatial dithering as well, for a regular, varied and dithered pattern.

In general, the dots will be of a size too small to resolve by the vision of a human observer viewing the display at a normal viewing distance. Undesirable artifacts can sometimes still be created by arrays with features that are not individually resolvable. Careful design of the variation of the pattern, and/or the variation and dithering of the pattern and/or the fundamental spacing and arrangement of the pattern can be used to mitigate or eliminate any such undesirable artifacts.

The embodiments of FIGS. 3a-3c are directed to an edge lighting scheme, essentially a scheme in which the elements are 'front' lit. It is possible to also use a backlighting scheme. Use of back light with a purely reflective modulator on a transparent substrate may also suffer from some limitations.

Figure 4:
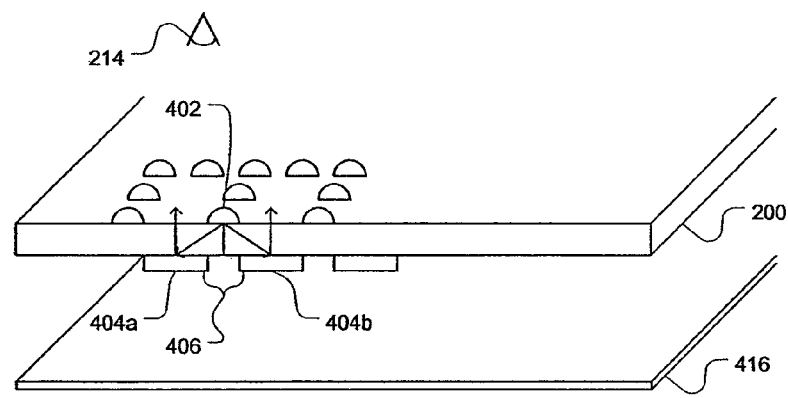
FIG. 4 shows an embodiment of an illumination dot pattern used with a back light.

The limitations in using a backlight with a purely reflective spatial light modulator array arise because the light travels from behind the modulating elements, such as elements 404a and 404b in FIG. 4, towards the viewer 216. The light can pass only through the very small gaps, such as 406, between the elements 404a and 404b. The modulator designer generally strives to keep these gaps as small a possible to maximize the reflectivity of the modulator. This limitation can be minimized by placing the dots on the top surface of the transparent substrate directly opposite the gaps between the elements. Typically, backlights such as 416 have uniform illumination characteristics and therefore uniform spacing would be appropriate. An example of such a pattern is shown in FIG. 4, where dots such as 402 are positioned to 'fill' the gaps. It is also possible to introduce variation into the placement of dots within the gaps.

Figure 5:
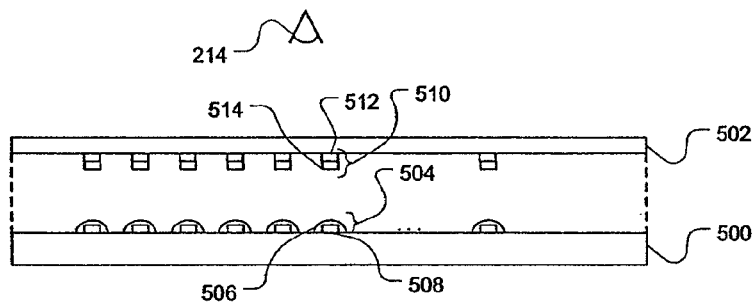
FIG. 5 shows embodiments of possible positions for illumination dots.

In addition to variation in the patterning of the dots, the surface upon which the dots are placed may also be varied. The dots will typically be placed so as to reside at the interface between the diffuser and the transparent substrate. Alternative surfaces for placement of the dots at this interface are shown in FIG. 5. The diffuser 502 is normally mated to the transparent substrate 500. For purposes of this figure, the diffuser has been lifted away from the substrate. The dots could be patterned onto the surface of the substrate 500, such as dot 504. Dot 504 has a reflective portion 508 towards the modulator array, not shown, and an absorbing portion 506 towards the viewer.

In an alternative, the dots could be placed on the surface of the diffuser 502, such as dot 510. Changing the position of the dots may modify the dot processing sequence. A dot on the surface such as 504 of the glass may have a first reflective material deposited and then covered by an 'overcoat' of absorbing material. If the dots reside on the surface of the diffuser such as 510, the absorbing material 512 would be put down first, then the reflective material 514. This maintains the proper orientation of the layers with regards to the modulator and the viewer 214.

Figure 6:
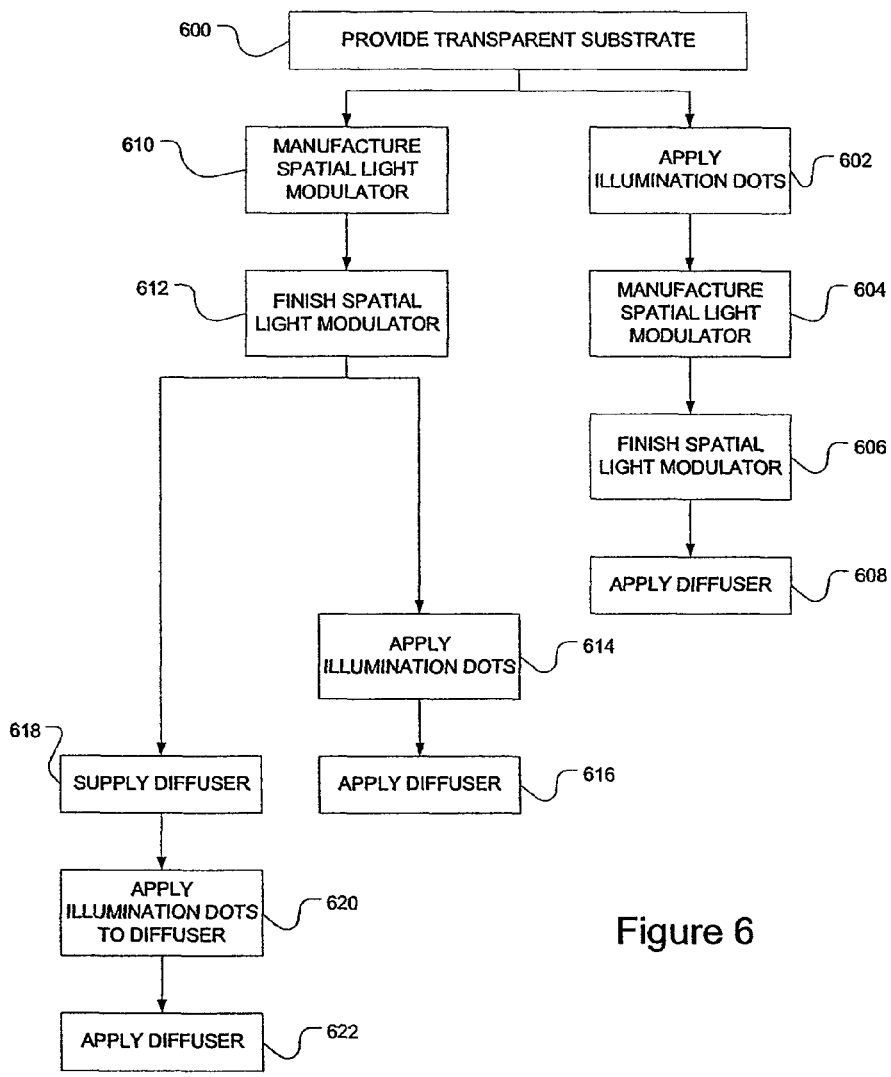
FIG. 6 shows a flow chart of a method to manufacture a spatial light modulator with illumination dots.

In addition to the flexibility in printing the dots on either the surface of the diffuser or the surface of the substrate and the flexibility as to what pattern and density the dots are printed, there is considerable flexibility as to the point in a manufacturing process the dots are formed. An embodiment of a method to manufacture a spatial light modulator array with illumination dots is shown in FIG. 6.

A first example of the process would start with providing a transparent substrate at 600. The illumination dots are applied to transparent substrate at 602. The spatial light modulator is then manufactured at 604. The modulator would be finished at 606, which may include such tasks as attaching a back plate. The diffuser is then applied to the substrate at 608, over the illumination dots. The combination of the diffuser and the transparent substrate may also be referred to as the display panel. The display panel may also comprise any other optical components, such as an antireflective film.

In an alternative embodiment, the spatial light modulator is manufactured on the 'back side' (away from the viewer) of the transparent substrate at 610. The spatial light modulator is then finished at 612. In one embodiment, the illumination dots are applied to the front side of the transparent substrate at 614 and then the diffuser is applied at 616.

In another alternative, a diffuser is supplied at 618 either after the modulator is finished at 612 or in parallel with the process of manufacturing and finishing the modulator. The illumination dots could then be applied to the diffuser at 620 and then the diffuser is applied to the transparent substrate at 622.

In any of the above embodiments, the process includes providing a transparent substrate with first and second surfaces, manufacturing the spatial light modulator on the second surface, applying the diffuser to the first surface and applying illumination dots. No order is implied by the listing the processes, as the order may change depending upon the embodiment.

For example, it may be desirable to put the dots on the substrate or the diffuser after manufacture of the modulator to allow for any printing mistakes to be made without affecting the yield of the modulator manufacture. If the dots are depositing during the manufacture process and something goes awry, it may negatively affect the yield of the process, as well as wasting an otherwise operable modulator. Putting the dots on the modulators that emerge from manufacturing may allow for more flexibility. Depending upon how the dots are formed, mistakes could be removed by cleaning the substrate with acetone or other solvents and techniques as appropriate, having no effect on the modulator elements sealed behind the substrate. Cleaning processes implemented during manufacture may damage the modulator.

The formation of the dots themselves may be done in one of many printing procedures, including lithographic printing, inkjet printing, screen-printing or any other type of printing technique. The dots could also be embossed onto the surface. Depending upon the type of technique used to deposit the dots, the shape of the dots may be controlled to maximize their effectiveness. As mentioned above, the dots would be printed at a resolution below the resolution of the human eye to avoid affecting the image quality as seen by the viewer.

Thus, although there has been described to this point a particular embodiment for a method and apparatus for illumination of purely reflective spatial light modulators, it is not intended that such specific references be considered as limitations upon the scope of this invention except in-so-far as set forth in the following claims.

What is claimed is:

1. A display device comprising:
    a transparent substrate having a front side and a back side, the back side configured to face away from a viewer;
    an array of spatial light modulators on the back side of the substrate, each spatial light modulator comprising a movable mirror configured to reflect modulated light out through the front side of the substrate;
    an edge illuminator residing at one edge of the substrate and configured to inject light into the one edge of the substrate, wherein light propagating from the edge illuminator propagates through the substrate due to total internal reflection from the front side and the back side of the substrate; and
    reflective elements on the front side of the substrate, the reflective elements configured to reflect the light to the array of spatial light modulators.

2. The display device of claim 1, further comprising a diffuser disposed on the front side of the substrate.

3. The display device of claim 2, wherein the reflective elements are disposed at an interface between the diffuser and the substrate.

4. The display device of claim 1, wherein the substrate comprises a first surface through which the viewer sees the modulated light and the reflective elements are disposed on the first surface.

5. The display device of claim 2, wherein the reflective elements are disposed on a surface of the diffuser.

6. The display device of claim 1, further comprising an anti-reflective coating on the front side of the substrate.

7. The display device of claim 1, wherein the spatial light modulators comprise a fixed partially reflecting surface and a cavity between the fixed partially reflecting surface and the movable mirror.

8. The display device of claim 1, wherein the spatial light modulators are fabricated directly on the substrate.

9. The display device of claim 1, wherein the reflective elements comprise illumination dots.

10. The display device of claim 9, wherein the illumination dots comprise a first layer that is reflective towards the spatial light modulators and a second layer that is absorbing towards the viewer.

11. The display device of claim 9, wherein the illumination dots have a size below the resolution of a human eye.

12. The display device of claim 1, wherein the edge illuminator comprises a light emitting diode.

13. The display device of claim 1, wherein the edge illuminator comprises a cold cathode fluorescent tube.

14. The display device of claim 1, wherein the edge illuminator comprises an edge emitting light pipe.

15. The display device of claim 14, wherein the edge emitting light pipe is illuminated by a light emitting diode.

* * * * *